United States Patent [19]
Fontana

[11] Patent Number: 4,655,381
[45] Date of Patent: Apr. 7, 1987

[54] MACHINE FOR AUTOMATICALLY APPLYING HOOKS TO ELASTIC BELTS

[76] Inventor: Anacleto Fontana, 46, Via Lambro, Lesmo, 20050, Italy

[21] Appl. No.: 734,723

[22] Filed: May 16, 1985

[30] Foreign Application Priority Data

May 16, 1984 [IT] Italy ................ 20937 A/84

[51] Int. Cl.⁴ .................................. A41H 37/02
[52] U.S. Cl. ........................... 227/15; 227/18; 227/21; 227/27; 227/46; 227/76; 227/77; 227/99; 227/155; 29/429; 29/509; 29/788
[58] Field of Search ............ 227/15, 18, 21, 27, 227/46, 76, 77, 80, 99, 152, 153, 155; 29/33 K, 429, 439, 509, 788

[56] References Cited

U.S. PATENT DOCUMENTS 3,004,262 10/1961 Cubbidge et al. ............ 227/155
3,986,533 10/1976 Woodman, Jr. ............ 227/155 X

FOREIGN PATENT DOCUMENTS

23571-B of 1982 Italy .

Primary Examiner—Mark Rosenbaum
Assistant Examiner—Taylor J. Ross
Attorney, Agent, or Firm—Millen & White

[57] ABSTRACT

The machine according to the invention comprises a device for feeding at least a continuous belt from a coil, a punching unit provided with at least a punch for punching holes into the belt; a cutter for cutting the continuous belt in segments of the desired length and a unit for applying and shaping the hooks to the belt. The unit includes a feeder for feeding and positioning the locking bushings relative to the belt holes, an inserter for inserting the hooks into the holes provided in the locking bushings and into the holes punched in the belt and a closer for closing the locking bushing about one hook end and for simultaneously shaping the other hook end.

18 Claims, 9 Drawing Figures

MACHINE FOR AUTOMATICALLY APPLYING HOOKS TO ELASTIC BELTS

BACKGROUND OF THE INVENTION

1. Field of the Invention

This invention generally relates to suspension elastic belts for seats, backs and the like, which are particularly but not exclusively intended to be used in the field of transport industry and of the furnishing and, more particularly, it relates to a machine for automatically applying hooks to the ends of such belts.

2. Description of the Prior Art

Suspension elastic belts have been well known for a number of years and are provided at both ends thereof with a hook intended to be inserted in a respective hole provided in a supporting frame. These elastic belts are mounted on the relevant frame under tension so as to support the conventional padded portion of the seat or back and to elastically accomodate the weight of sitting persons.

Of course, the elastic belts must have the necessary strength and be very resistant, particularly in the location in which the hook is secured, since this is the weakest area most liable to fatique wear.

In a preceding Italian Utility Model of the same applicant this wear problem has been solved by providing a T-shaped hook which is mounted on the belt ends through a bushing provided with a center hole intended to receive the hook shank so that the T-projecting arms will lie in this bushing which is then closed about these arms so that the belt ends will be locked by the bushings, thereby firmly retaining the hooks in position. This, of course, represents an advantage with respect to the hooking systems heretofore used. However, the very pronounced disadvantage suffered by these elastic belts lies in the fact that the hooks are still applied to the belts by hand or by hand-operated small devices and this operation, therefore, is time consuming and very expensive since it requires much labor.

SUMMARY OF THE INVENTION

The main object of the present invention is to overcome these drawbacks by providing a machine for automatically applying hooks to suspension elastic belts which machine is reliable in operation, simple and readily operable.

More particularly, the machine for automatically applying hooks to suspension belts in accordance with the present invention comprises feeding means for feeding at least a continuous belt from a coil, a punching unit provided with at least a punch for punching holes into the belt; a cutter for cutting the continuous belt in segments of the desired length and a unit for applying locking bushings on the cut ends of belt and for applying and shaping the hooks to the belt. The unit includes means for feeding and positioning the locking bushings relative to the belt holes, means for inserting the hooks into the holes provided in the locking bushings and into the holes punched in the belt and means for closing the locking bushing about one hook end and for simultaneously shaping the other hook end.

DESCRIPTION OF THE PREFERRED EMBODIMENTS

Figure 1:
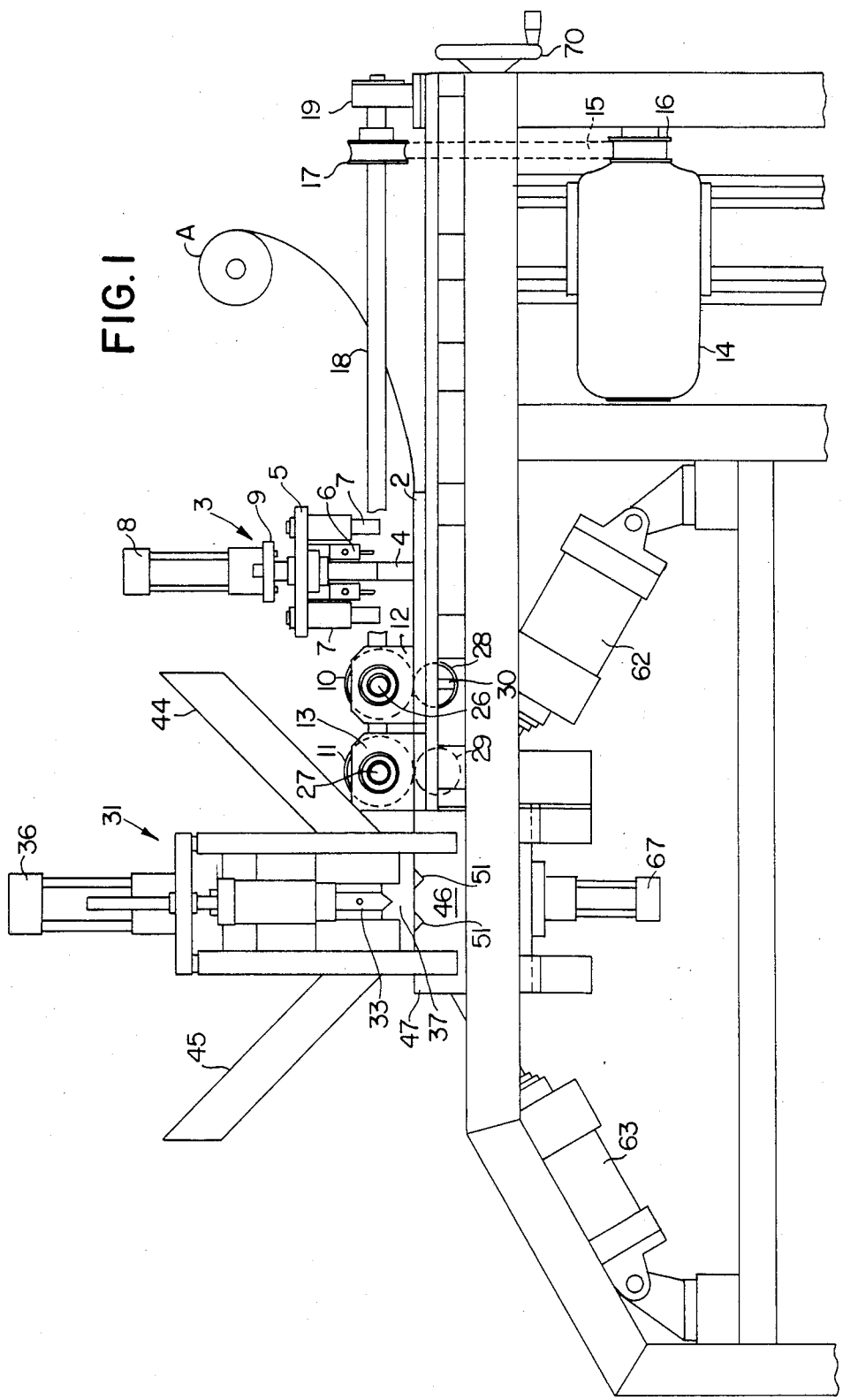
FIG. 1 is a side elevation view of an embodiment of the machine for automatically applying hooks to elastic belts according to the present invention, the hooks being T-shaped in form.
Figure 2:
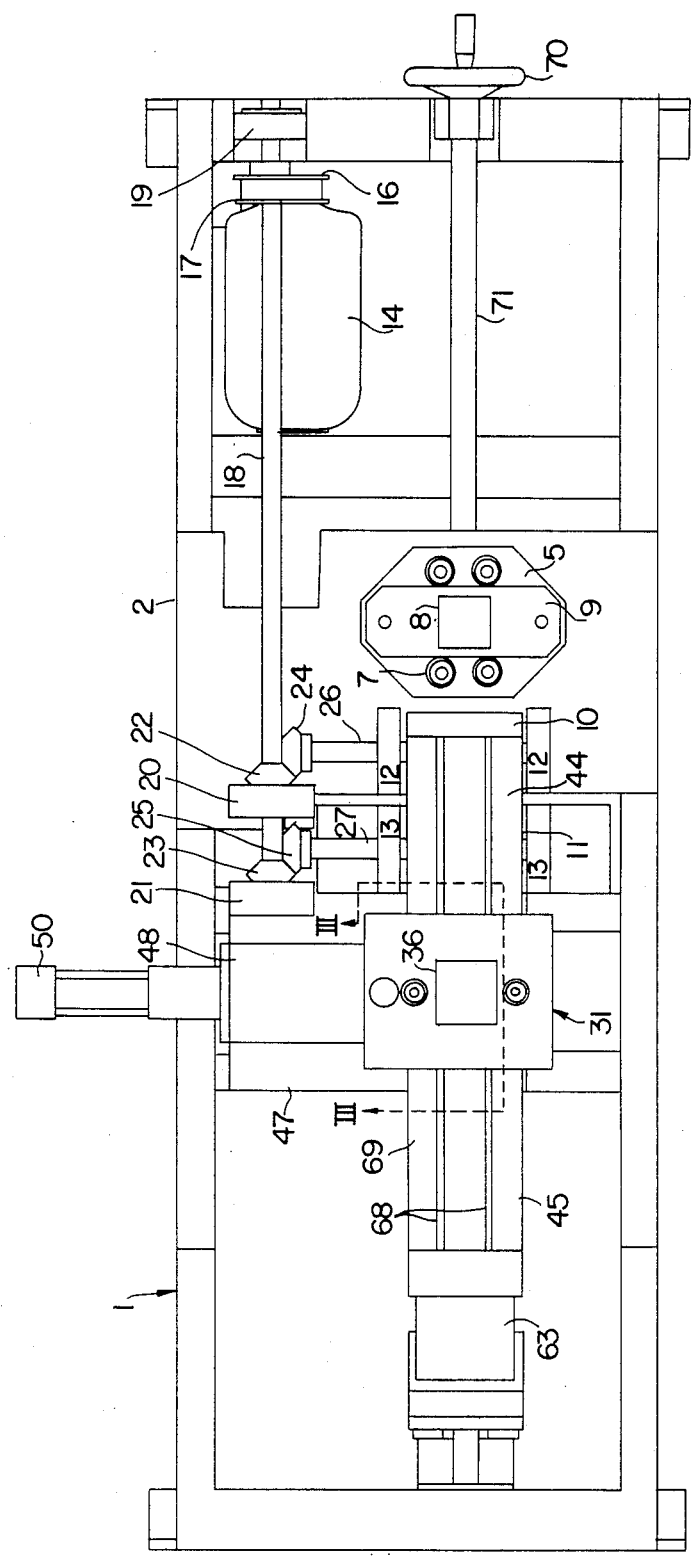
FIG. 2 is a top plan view of the machine shown in FIG. 1.

As can be seen from FIG. 1 and 2, the machine according to the invention for automatically applying hooks to the ends of elastic suspension belts comprises a frame 1 supporting all the main components thereof. On the frame top a supporting table 2 is applied, which is intended to slidingly support the elastic belts coming from coils A. The machine can simultaneously deal a plurality of belts arranged side-by-side. In the illustrated machine, two side-by-side arranged belts are provided. These two belts pass first through a punching unit, generally indicated by the reference numeral 3, and having a pair of uprights 4 secured to the table 2 and on which a punch-holding plate 5 is slidingly mounted, which is provided with four punches 6 arranged in pairs of two and with four spring loaded feet 7. The downward and upward movements of the punch-holding plate 5 are derived from a pneumatic cylinder 8 secured to a cross-piece 9 connecting on the upper side the pair of uprights 4, and the piston rod of which is connected to the punch-holding plate 5.

The punches 6 are arranged in pair so as to provide in the relevant elastic belt a pair of holes spaced from each other a predeterminable distance along the longitudinal center line of the belt. In order to provide holes having a net contour, which does not promote frays, the punches 6 are preferably heated (electrically for example) so as to weld to each other the ends of the warp and weft yarns severed by the punches 6.

Downstream the punching unit 3 two feeding rolls 10,11 are arranged, which serve to move the belts on the support table 2 and which are supported by two side shoulders 12 and 13, respectively. These rolls 10 and 11 are rotated by an electric motor 14 through a driving belt 15 and a pulley 17 keyed to a shaft 18 extending along the machine frame 1 and supported by the bearings 19,20 and 21. This shaft 18 carries two bevel gears 22 and 23 at one end meshed with gears 24 and 25 mounted on shaft 26 and 27 for driving the rolls 10,11 moving the elastic belts. Below each roller 10,11 pressure idler rollers 28 and 29 respectively are arranged, which are mounted on springs 30 urging them against the rolls 10,11. The two elastic belts arranged side-by-side can be then inserted below the punching unit 3 and advanced towards the unit for cutting the elastic belts and for feeding and inserting the hooks therein, generally indicated at 31.

This unit (see FIG. 1) is mounted on a frame 32 and comprises a cutter 33 provided with a guiding plate 34, having support feet 35, the cutter and guiding plate being reciprocable in a vertical direction under the action of a pneumatic cylinder 36 within a guiding passage 37 provided in a block 38 secured to the underside of the frame 32. The side walls 39 of the guiding passage 37 are provided with elastic tongues 40 having the free ends bent outwardly, these tongues penetrating respective cutouts 41 formed in each of the side walls 39 and projecting in a pair of transversal slots 42 provided in the block 38 outside of the side walls 39. In each transversal slot 42 a plate 43 vertically moves under control of the pneumatic cylinder 36, this plate being provided with retaining elements, in the form of permanent magnets M.

On both sides of block 38 hook feeders 44 and 45 are applied, which enter the block in a seat provided therein so that the hooks G, which are arranged in the hook feeders on two rows with their projecting arms B upwardly disposed, enter the slots 42 with the projecting arms B above the outwardly bent end of the elastic tongues 40, thereby retaining the innermost hook in position in the slots 42. Of course, the width of slots 42 does correspond to the hook thickness, so that in the slots 42 only a hook at a time can pass. The hook feeders 44,45 are here shown as gravity feeders, but they could be also of a different kind,f. i. of compression spring type.

Figure 3:
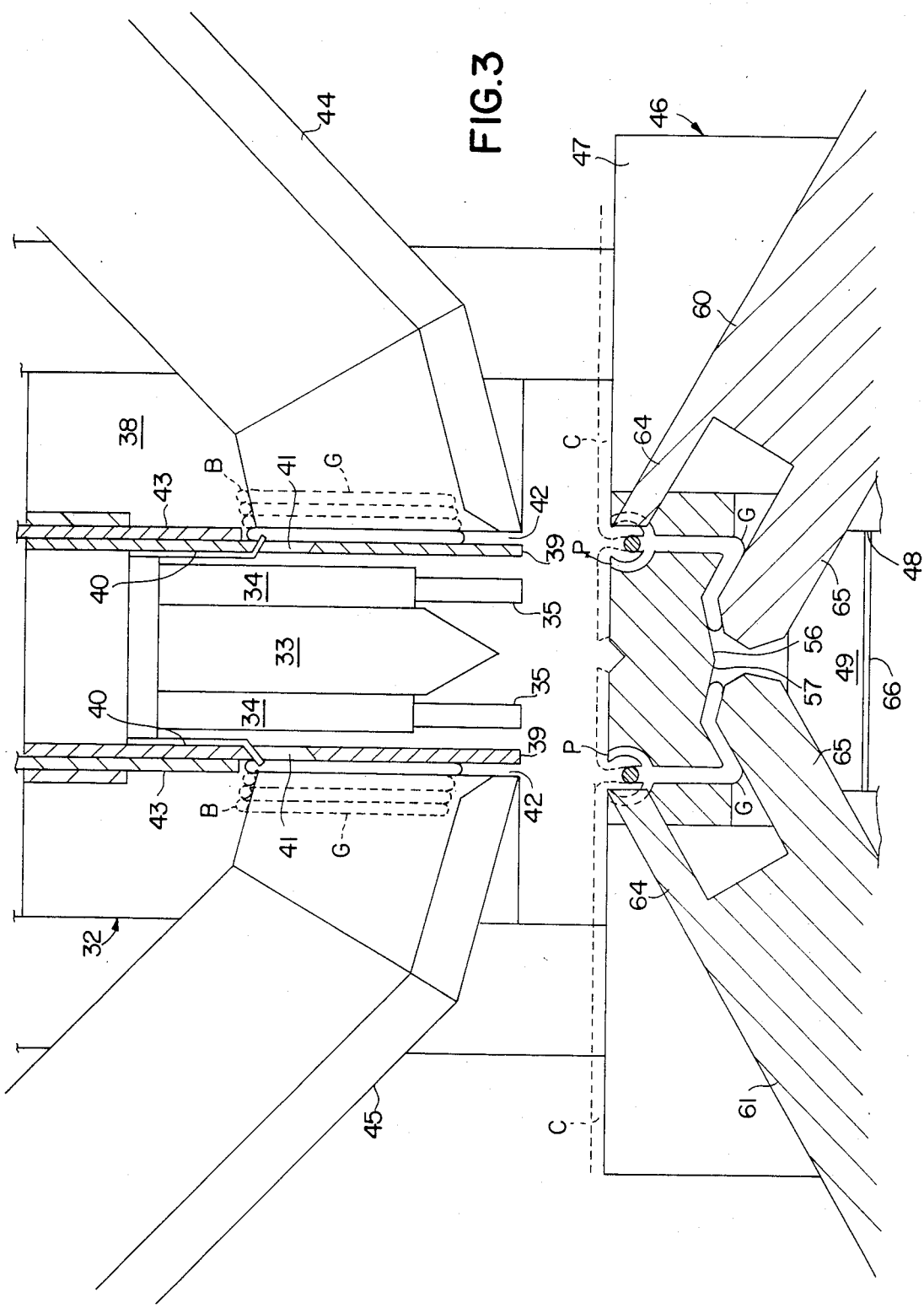
FIG. 3 is a cross-sectional view taken along the line III—III of FIG. 2.
Figure 5:
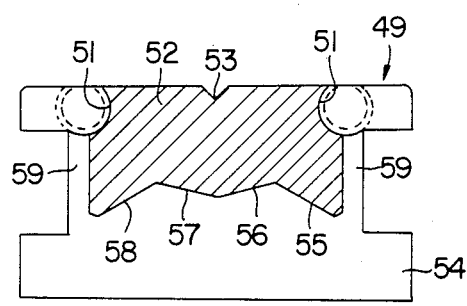
FIG. 5 is a partial diagrammatic view of the plate inserting the hooks into the relevant locking bushings being about to shift two hooks arranged side by side out of retaining springs.
Figure 6:
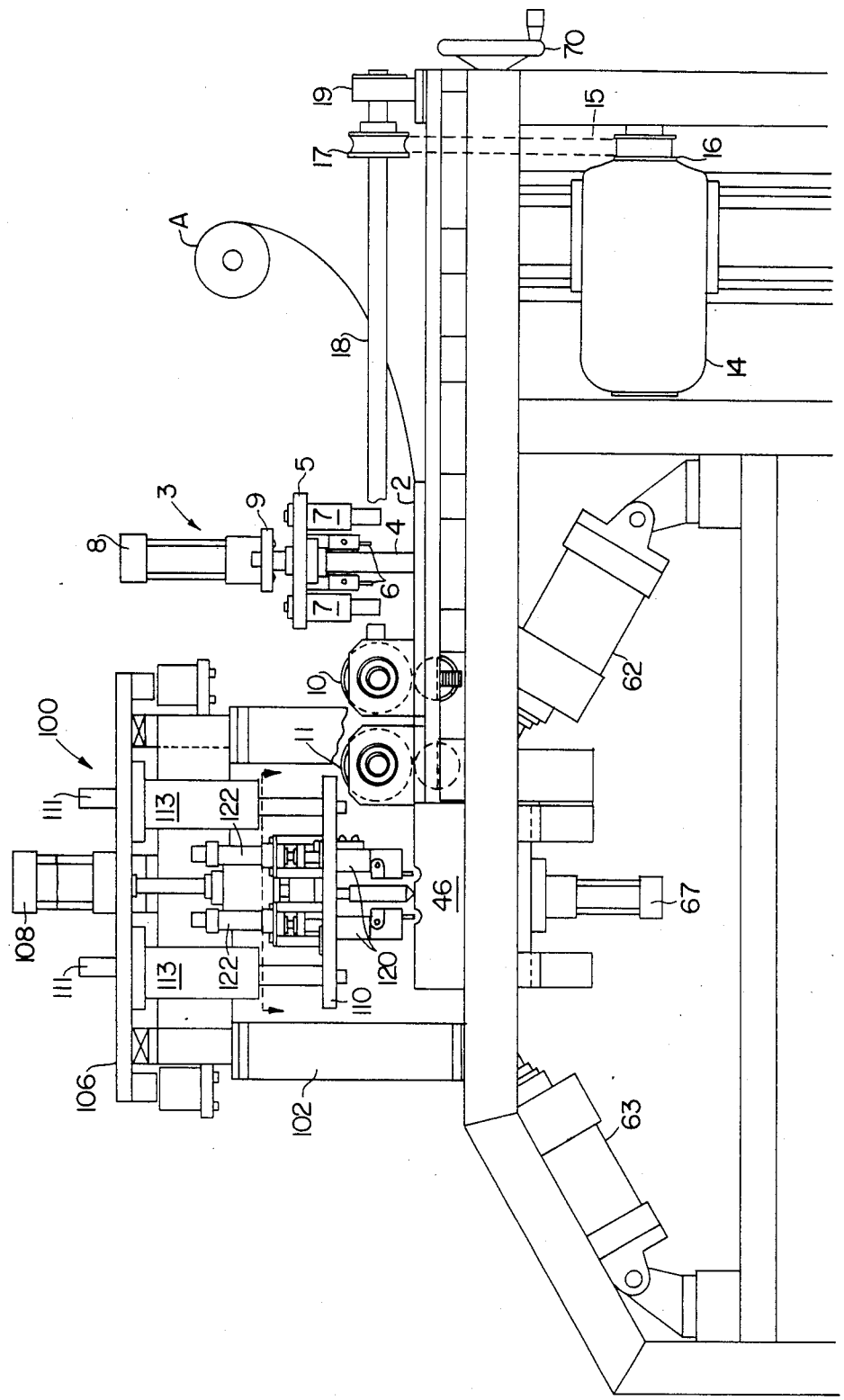
FIG. 6 is a side elevation view of another embodiment of the machine for automatically applying hooks to elastic belts, the hooks being of any kind suitable to be applied to such belts.

Below the unit 31 for cutting the elastic belts and for inserting the locks therein, a unit for feeding locking bushings and for closing them around the projecting arms B of hooks G is arranged, which is generally indicated by 46 and is best seen in FIGS. 1,3 and 5.

This unit is formed of a block 47 having at the belt cutting and hook inserting unit 31 a transversal seat 48 in which a slider 49 is arranged, which is horizontally reciprocable therein under the action of a pneumatic cylinder 50 (FIG. 2). The slider 49 is provided on the upper surface with semicylindrical seats 51 provided in locations corresponding to the hook inserting slots 42 and intended to receive locking bushings P being semicircular in crosssection and being fed therein by a conventional feeder (not shown) when the slider is in the position shown in FIG. 3.

As can be seen in FIG. 5, the slider 49 comprises a center body 52 having in its center a notch 53 designed to receive the cutting edge of cutter 33 and two side shoulders 54 integrally formed with the body 52 and of greater height. The lower surface of body 52 is shaped in the form of an inverted double V so as to have a first upwardly inclined portion 55 followed by a second downwardly inclined portion 56, in turn followed by a third upwardly inclined portion 57 to which a fourth downwardly inclined portion is connected, looking from right hand to left hand in FIG. 5. This shaping is designed to form the curved point of hook as will be discussed later. The semicylindrical seats 51 are cut in its lower portions so as to form a housing 59 for the hook G extending through the body 52.

Each of the two open sides of slider 49 is designed to receive a punch 60 and 61 respectively, which is slidable within associated housings provided in the block 46, which have such an inclination that the axis of punches 60,61 is parallel to the lower inclined portion 56 and 57, respectively, of the body 52 of slider 49. Both punches are reciprocable by means of associated pneumatic cylinders 62 and 63, respectively (FIG. 1) and are provided with a forked head the one arm 64 of which is intended to contact one side of the associated locking bushing P and the other arm 65 of which is intended to bend the end of the hook shank in accordance with the shaping of the lower surface of body 52 of sender 49.

Finally, the machine is completed by a device, not shown, comprising a plate 66 vertically sliding within the slider seat 48 and moved by a pneumatic cylinder 67 (FIG. 1) the task of which is to close the window which is left open by the slider when it is removed from its seat 48, and so to offer in this location a support to the elastic belts C (FIG. 3) provided with the hooks.

After having described the machine structure, its operation will be now described.

A number of elastic belts arranged side-by-side, in this case two, coming from two coils, not shown, are disposed on the support table 2, are passed below the punching unit 3 and then are inserted below the pair of feeding rolls 10,28;11,29.

Now, the motor 14 is started, which, through the driving members 16,15,17,18,22,23,24 and 25, will rotate both driving rolls 10,11, which will feed the two elastic belts arranged side by side to the unit 31 for cutting the belts and applying the hooks below which the unit 46 for applying the locking bushings and for shaping the hooks is placed. A handwheel 70 serves to adjust the length of the elastic belt segments which are to be cut away. This hand-wheel, through a threaded rod 71, will act on the supporting table 2 moving it to and away the cutting unit 31. Once the length of the elastic belt segments is adjusted, the elastic belts are stopped and,- through the pneumatic cylinder 8, the punching unit 3 is actuated, which by means of its punches 6 will punch in the associated elastic belt two spaced holes, while the feet 7 bear on the elastic belts, thereby retaining the belts stationary in place, since the feet 7 contact the belts in advance of the punches 6. As already said, the punches 6 are heated at such a temperature as to permit the ends of the yarns forming the elastic belts to be welded together,so that the holes punched by the punches will present a net contour.

Figure 4:
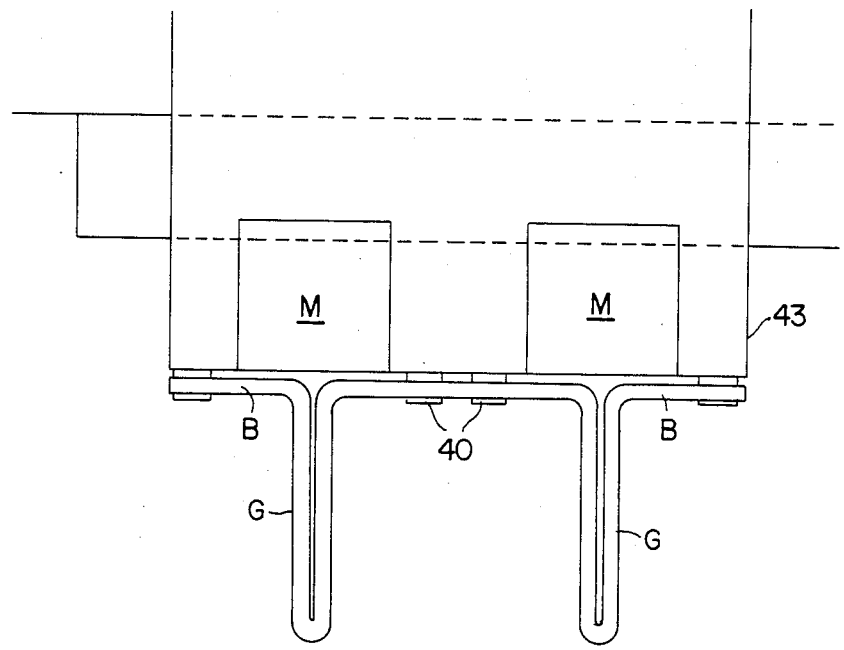
FIG. 4 is a cross-sectional view taken through the locking bushing positioning slider.

The punching unit 3 is then lifted by the pneumatic cylinder 8 and the elastic belts are advanced until the belt portion between the two punched holes lies below the cutter and both the punched holes lie at the semicylindrical seats 51 of slider 52, which is in an inserted position below the cutting unit 31 with two locking bushings P semicircular in crosssection being inserted into the respective seats 51 by the external feeder (not shown). In this position the center holes of the locking bushings P will be in alignment with the punched holes in the elastic belts and the slots 42 feeding the hooks 6. Now, the pneumatic cylinder 36 of the cutting unit 31 is actuated simultaneously with the pneumatic cylinder 8 of the punching unit 3 with the feet 35 of the former and the feet 7 of the latter retaining the stationary elastic belts in position. While the punching unit punches the two sets of holes in the elastic belts, the cutter 33, which is also suitable heated for performing a net cut and symultaneously welding the severed ends of the yarns forming the elastic belts, will perform the cutting operation of the belts in the belt portion between two subsequent holes. Together with the cutter 33, also the inserting plates 43 sliding within the slots 42 of block 38 are lowered, these inserting plates 43 punching downwardly the hooks G through the projecting arms B thereof, so that the elastic tongues 40 are retracted and the hook retained thereby can be lowered together with the associated plate 43, be being hanged thereto by means of the permanent magnets M (FIG. 4). Thus, the hook shank can enter the center hole of the locking bushing P, and find place in the associated seat 59, while the projecting arms B of the hook will engage the elastic belt C, carrying it into the locking bushing, as shown by the dashed line in FIG. 3.

At this point, the punches 60,61 of the unit for shaping the hooks and closing the bushings P are actuated by the pneumatic cylinders 62 and 63. The arm 64 of those punches will close the locking bushing around the hook projecting arms, while the arm 65 will shape the hook shank end in accordance with the shaping provided on the lower surface of body 52 of slider 49. Once these operations have been performed, the two punches are removed from the slider 49. Now, the slider will be horizontally moved to the extracted position by the pneumatic cylinder, 50 thereby releasing the ends of the belts provided with a hook and a bushing closely surrounding the hook projecting arms, with the interposition of the elastic belt.

Once the slider 49 has been brought in the extracted position, the ejecting plate 66 is lifted, thereby lifting the two ends of the elastic belts provided with a hook and then the belts will be advanced by the driving rolls 10,11, whereas the belt segment severed and provided at both ends with a hook will fall in a collecting vessel (not shown).

Then the slider 49 will be again brought in the inserted position below the cutting unit, after the ejecting plate 66 has been lowered, and all this cycle is again repeated.

The hooks are arranged in the associated feeders 44,45 with their shanks downwardly directed within an associated slot 68, whereas the projecting arms B bear on sliding surfaces 69. Since two elastic belts arranged side by side are provided, the hook feeders 44,45 each have two slots (FIG. 1). The hooks can be fed by gravity as shown in the drawings, or else by means of compression springs.

The embodiment shown in FIGS. 6,7,8 and 9 is particularly directed to a unit for picking-up and inserting hooks in the elastic belts, which can deal any kind of hooks, including hooks in the form of rings or the like, which can be sometimes required in connection with these suspension belts.

The machine is the same as that shown in FIGS. 1 through 5, with the exception that in place of the unit 31, the unit 100 of this second embodiment has been employed and mounted thereon.

This unit comprises a frame 101 formed of four uprights 102, the lower ends of which are designed to be secured to the machine frame, and the upper ends of which support two rails 103 extending from a position above the hook magazine, here diammatrically shown by two hooks G indicated in dashed line at 104, to a position above the elastic belts C, here diammatrically illustrated in dashed line at 105.

On the rails 103 a carriage 106 moves, which is provided with roll bearings 107 so that it can also move from the hook pick-up position to the hook inserting position.

The carriage 106 centrally carries a pneumatic cylinder 108 to the piston rod 109 of which a support plate 110 is secured which, therefore, can be lifted and lowered being guided in its alternative up and down movements by four rods 111 fastened thereto by screws 112 and moving the bearings 114 in bushings 113.

The guide bushings 113 are secured to the carriage 106 through flanges and screws 115. Therefore, the plate 110 can be lifted and lowered by the pneumatic cylinder 108, firmly guided in the bushings 113. Secured to the plate 110 are a cutter 116, located at the center thereof and fastened thereto through a spring 117 and having a bore 118 intended to receive a heating medium for the heating thereof, as well as four hook clamping elements, generally indicated by 120, as well as six release elements for releasing the hooks from the clamps, generally indicated by 119. The hook clamping elements 120 are secured to the ends of piston rods 121 of pneumatic cylinders 122 controlling the up and down movements of the clamping elements 120. The hook release elements 119 comprise rods carrying at their lower ends plates 123 adapted to engage the hook portions projecting from the clamps, said rods being secured at their upper ends to plate 110 by means of screws 124.

The clamping elements have at their lower ends clamps 125 formed of two jaws, of which one is fixed and the other is pivoted at 126 to the associated clamping element, the clamping force of this jaw being adjusted through a spring 127 retained on a screw 128.

The four pneumatic cylinders 122 are fastened to the plate 110 by bolts 129 passing through supporting sleeves 130.

The arrangement is made in such a manner as to have two hook clamping elements aligned with one elastic belt and the other two hook clamping elements aligned with the other elastic belt, whereas the hook release elements are arranged outside of two clamping elements and therebetween, so that the center hook release element acts on the hooks of the clamps arranged side by side, as shown in FIG. 3 in the righthand portion.

Figure 7:
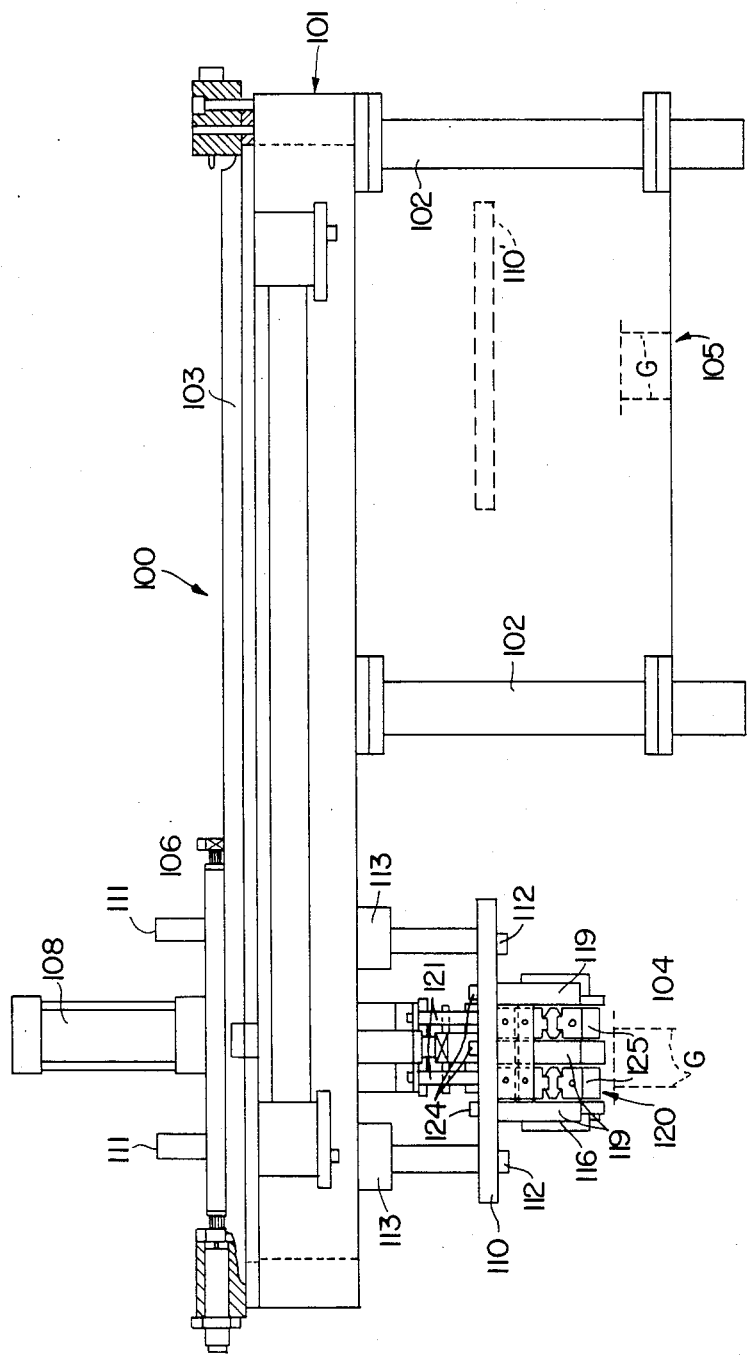
FIG. 7 is a front view of the unit for picking up and inserting the hooks into the belts shown in FIG. 6.
Figure 8:
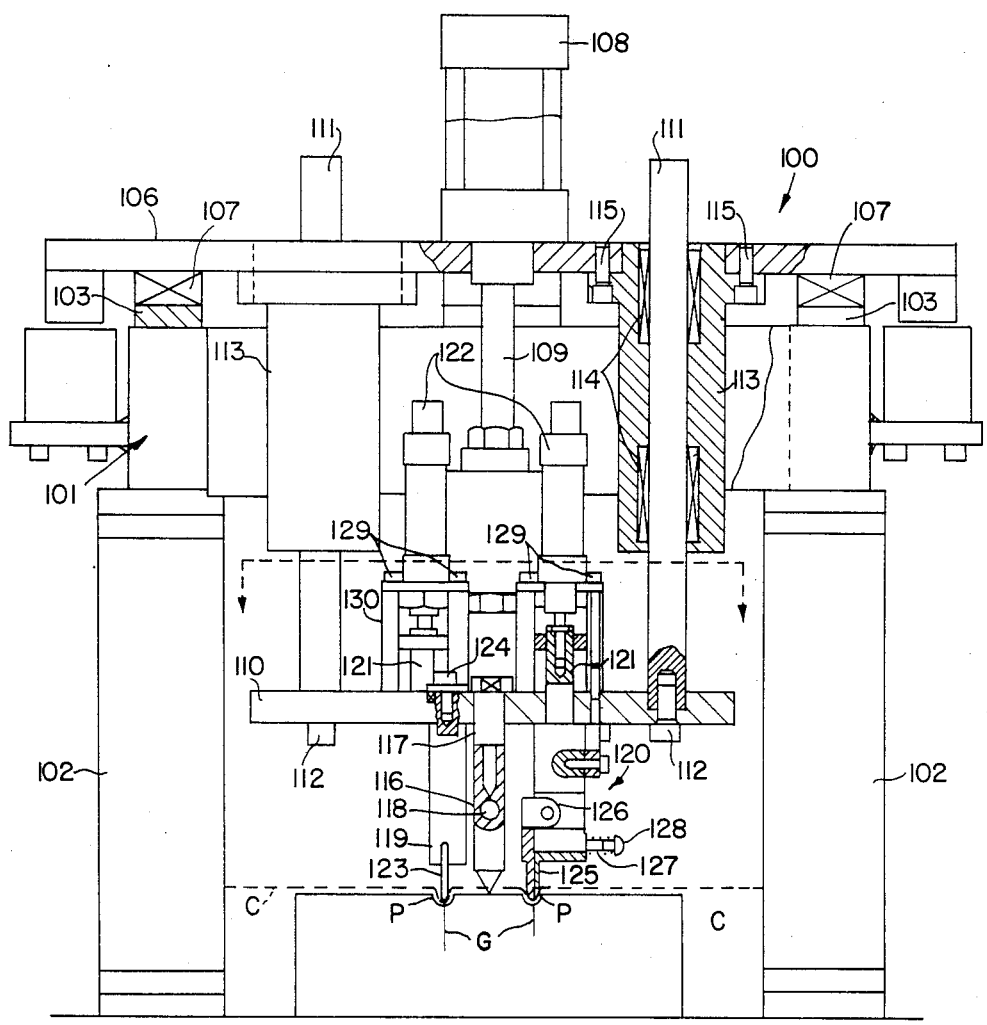
FIG. 8 is a sectional view, taken along the line VIII—VIII of FIG. 9.
Figure 9:
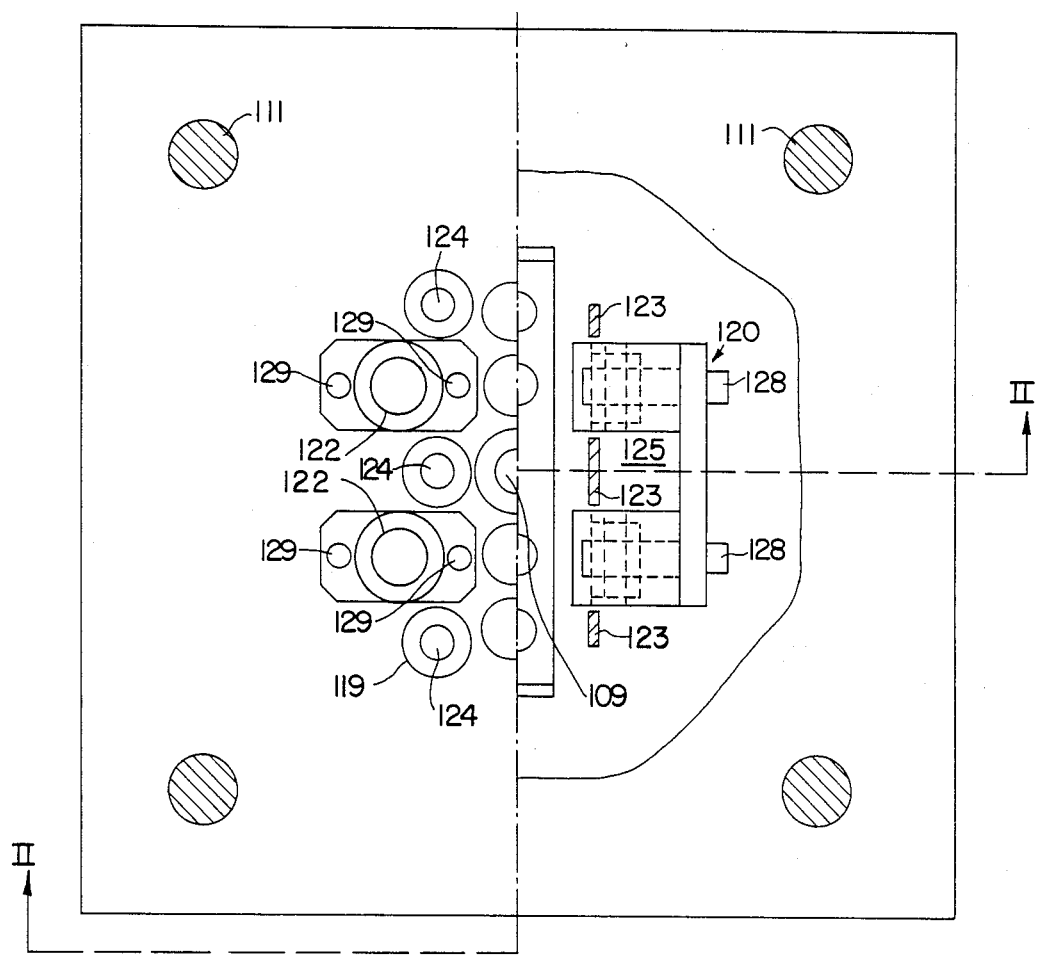
FIG. 9 is a plan view looking along the line IX—IX of FIG. 8.

The operation of this unit is as follows:

At the beginning the plate 110 carrying the hook clamping elements 120 and the hook release elements 119 is in a lifted position by means of the pneumatic cylinder 108 and the carriage 106 is moved to the left by an its own pneumatic cylinder (not shown), as can be seen in FIG. 7.

Then, when the carriage is come above the hook feeder 104, the plate 110 is lowered by the pneumatic cylinder 108 until it is above the hooks G which are inserted into the clamps 125 by snap action by an inserting member (not shown), forming part of the hook feeder 104. The plate 110 is then lifted by the pneumatic cylinder 108 and the carriage 106 is moved to the right in FIG. 7, until it takes the position 110' shown in dashed line, where the hooks G are aligned with the holes in the belts C and in the locking bushings P. At this point plate 110 is again lowered by the pneumatic cylinder 108 until the hook tips are at a short distance from the belts, and then the hook clamping elements 120 are lowered by the pneumatic cylinders 122 so as to introduce the hook tips into the holes of the locking bushings and the belts. At this point the hook clamping elements are lifted while the plate 110 is again lowering, so that the plates 123 of the hook releasing rods 119 contact the hook portions projecting from the clamps 125, causing them to snap out therefrom, being aided in this also by the upwardly movement of the hook clamping elements 120 under control of the pneumatic cylinders 122.

Thereafter, plate 110 is again lifted by the pneumatic cylinder 108 in its uppermost position where it bears against the bushings 113, thereby lifting the hook release elements 119 and the pneumatic cylinder 122 with the hook clamping elements 120 fastened thereto and the carriage 106 will be again moved to left (FIG. 7) until the hook pick-up position is reached.

As can be seen from this description, the unit for picking-up and inserting hooks in elastic belts solves in a manner known per se the problem of dealing hooks of any kind, since the hooks are retained by the clamps 125, the clamping force of which can be adapted to the different hook types, and furthermore this unit is of a reliable operation without the occurrence of jamming and sticking phenomena during the hook inserting operations.

While this invention has been described and illustrated in connection to two embodiments only, it should be understood that changes and modifications can be made thereto by those skilled in the art, without departing from the scope of the invention as defined in the appended claims.

What I claim is:

1. A machine for automatically applying hooks to suspension elastic belts used for seats and seat backs, said machine comprising: belt feeding means for feeding at least one continuous belt from a stock coil; a punching unit provided with at least a punch for punching holes in the belt; cutting means for cutting the continuous belt into segments of the desired length, and a unit for applying and shaping hooks and for applying locking bushings to the severed ends of the belts, said unit having means for feeding and positioning said locking bushings in alignment with the belt holes, hook inserting means for picking-up and inserting the hooks into the holes provided in said locking bushings and the holes punched in said elastic belts, and clamping means for clamping said locking bushings about one end of the hook while simultaneously shaping the other hook end.

2. A machine as claimed in claim 1, wherein heating means are provided for heating said punches and said cutting means in order to weld the ends of severed belt yarns in the elastic belt to each other to prevent a fraying of the elastic belt.

3. A machine as claimed in claim 1, wherein said belt feeding means are in the form of driving rolls which are driven by a motor through driving means, and which cooperate with corresponding idler rolls.

4. A machine as claimed in claim 1, wherein said clamping means for clamping said locking bushings about the hook end comprises at least a punch so arranged as to contact a side of the associated bushing through an associated opening therein provided in a slider to press it against the other side for closing the hook end therein with the interposition of the belt.

5. A machine as claimed in claim 1, wherein the shaping means for simultaneously shaping the other hook end comprises a projection on said clamping means, adapted to cooperate with a contoured portion of a slider so as to bend the hook tip to simultaneously shape same.

6. A machine as claimed in claim 1, wherein said punching unit, said belt cutting means and hook inserting means and said slider are pneumatically, hydraulically or electro-magnetically operated.

7. A machine as claimed in claim 1, wherein said means for applying the hooks to the belt and to the locking bushings comprises at least a vertically reciprocable hook inserting plate, movable in a sliding guide, which is provided with retaining means for the hooks coming from a hook feeding means in the path of said hook inserting plate so that, for every operative stroke of the latter, a hook to be introduced will lie always on said retaining means.

8. A machine as claimed on claim 7, wherein said hook retaining means in the sliding guide comprises elastic blades having ends which are bent into the path of said hook inserting plate and adapted to elastically yield out of said path during the passage of said hook inserting plate.

9. A machine as claimed in claim 1, wherein the bushings for locking the hooks to the elastic belt ends are semicircular in cross-section.

10. A machine as claimed in claim 9, wherein said positioning means for said locking bushings of semicircular cross-section comprise a slider and means for mounting the slider for horizontal reciprocation in a direction transverse to the belt feeding direction; the unit being provided with semicylindrical seats for accomodating said locking bushings, said slider being movable between two positions, namely an inner position where said seats provided with locking bushings are aligned with the belts, the bushing holes being aligned with the belt holes and an outer position for releasing the bushings already applied to the belt ends from the associated semicylindrical seats.

11. A machine as claimed in claim 10, wherein said slider is provided with side openings for receiving said clamping means for clamping said locking bushings about one end of a hook.

12. A machine as claimed in claim 1, wherein said unit for inserting the hooks into the holes of said locking bushings and elastic belts, comprise one or more hook clamping elements having clamps, movable from a hook picking-up position to a hook inserting position, and hook release elements for releasing the hook from said hook clamping element.

13. A machine as claimed in claim 12, wherein said hook releasing elements comprise rods having at their lower ends releasing plates for engaging hook portions projecting from said hook clamping elements so as to remove the hooks therefrom during the lifting movement of the hook clamping elements, said rods being arranged on the sides of each clamping element.

14. A machine as claimed in claim 12, wherein said hook clamping elements are secured to a support plate by means of piston rods of pneumatic cylinders fastened to said support plate, said piston rods being slidable in holes provided in said support plate.

15. A machine as claimed in claim 12, wherein said support plate also supports the cutting means for cutting the elastic belts, the cutting means having heating means therein and being secured to said support plate through pins and springs.

16. A machine as claimed in claim 12, wherein the clamps of said hook clamping elements are formed of a fixed jaw and a movable jaw, the clamping elements having a clamping force of which is adjustable by screws.

17. A machine as claimed in claim 12, wherein said hook clamping elements and said hook releasing elements are applied to a common support plate which is movable up and down and fastened to a carriage movable to and fore on rails between said hook pick-up position and said hook inserting position, said hook clamping elements being provided with lifting and lowering means fastened to said support plate.

18. A machine as claimed in claim 17, wherein said common support plate is secured to said carriage through a piston rod of a pneumatic cylinder fastened to said carriage and designed for actuating said plate, which is guided by rods sliding in bushings secured to said carriage.

* * * * *